US011137660B2

(12) United States Patent
Ikeda et al.

(10) Patent No.: US 11,137,660 B2
(45) Date of Patent: Oct. 5, 2021

(54) IMAGE CAPTURING APPARATUS, IMAGE PROCESSING APPARATUS, CONTROL METHOD OF IMAGE CAPTURING APPARATUS, AND NON-TRANSITORY COMPUTER-READABLE STORAGE MEDIUM

(71) Applicant: CANON KABUSHIKI KAISHA, Tokyo (JP)

(72) Inventors: Takeshi Ikeda, Tokyo (JP); Kazuya Miyazaki, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 244 days.

(21) Appl. No.: 16/536,651

(22) Filed: Aug. 9, 2019

(65) Prior Publication Data

US 2020/0050073 A1 Feb. 13, 2020

(30) Foreign Application Priority Data

Aug. 13, 2018 (JP) .............................. JP2018-152436

(51) Int. Cl.
*G02F 1/163* (2006.01)
*G02F 1/155* (2006.01)
*G02F 1/1523* (2019.01)

(52) U.S. Cl.
CPC .............. *G02F 1/163* (2013.01); *G02F 1/155* (2013.01); *G02F 1/1523* (2013.01)

(58) Field of Classification Search
CPC ........ G02F 1/163; G02F 1/155; G02F 1/1523; G02F 1/15; G02F 2203/48; G03B 11/00; G03B 7/00
See application file for complete search history.

(56) References Cited

U.S. PATENT DOCUMENTS

2014/0247386 A1* 9/2014 Takagi ................... H04N 5/238
348/362

FOREIGN PATENT DOCUMENTS

JP 2015-534127 A 11/2015
WO 2014/059268 A2 4/2014

* cited by examiner

*Primary Examiner* — Joseph P Martinez
(74) *Attorney, Agent, or Firm* — Cowan, Liebowitz & Latman, P.C.

(57) ABSTRACT

An image capturing apparatus is provided. The image capturing apparatus comprises an image capturing element configured to capture an object image formed by light that has passed through an optical member using an electrochromic element and capable of electrically controlling a transmittance of the light. The image capturing apparatus further comprises one or more processors that execute a program stored in a memory, wherein the program, when executed by the one or more processors, causes the one or more processors to function as: a distribution acquisition unit configured to acquire a distribution characteristic of a transmittance of the electrochromic element based on a current value flowing to the electrochromic element; and an image processing unit configured to correct an image signal captured by the image capturing element in accordance with the distribution characteristic.

20 Claims, 5 Drawing Sheets

IMAGE CAPTURING APPARATUS, IMAGE PROCESSING APPARATUS, CONTROL METHOD OF IMAGE CAPTURING APPARATUS, AND NON-TRANSITORY COMPUTER-READABLE STORAGE MEDIUM

BACKGROUND OF THE INVENTION

Field of the Invention

The present invention relates to an image capturing apparatus, an image processing apparatus, a control method of the image capturing apparatus, and a non-transitory computer-readable storage medium.

Description of the Related Art

An image capturing apparatus such as a video camera sometimes uses an ND (Natural Density) filter that is an optical member configured to reduce a light amount to implement a desired image capturing condition. The light amount reducing effect of the ND filter changes depending on the density, and an ND filter with an appropriate density needs to be used in accordance with an image capturing situation. To make the density of the ND filter changeable during image capturing, some image capturing apparatuses include a turret-type or removable ND filter unit. When exchanging the ND filter in these image capturing apparatuses during image capturing, an end of the ND filter, a mechanism configured to move the ND filter, and the like pass in front of an image sensor for image capturing, resulting in a disturbance in an image.

To suppress a disturbance in an image caused by exchanging ND filters of different densities, ND filters with variable transmittances have been developed. One of them is an ND filter using an electrochromic element (EC element). Japanese Patent Laid-Open No. 2015-534127 discloses a control apparatus configured to change the transmittance of an EC element.

SUMMARY OF THE INVENTION

The ND filter using an EC element can change the light amount that enters an image sensor without causing a disturbance in an image at the time of density change. However, since a relatively large current flows to the EC element, a potential distribution is generated in the plane of the EC element due to a voltage drop. By this potential distribution, optical density (transmittance) unevenness occurs in the plane of the EC element. When the optical density unevenness occurs, brightness unevenness occurs in a captured image, resulting in poor image quality. As a measure against the voltage drop, the film thickness of a transparent electrode configured to supply power to the electrochromic layer (EC layer) of the EC element may be increased to lower the resistance. However, under a condition to increase the light amount entering the image sensor, the thick transparent electrode leads to a decrease in light transmittance.

Some embodiments of the present invention provide a technique of suppressing lowering of image quality caused by the distribution of the transmittance of an optical member using an EC element in an image capturing apparatus.

According to some embodiments, an image capturing apparatus comprising an image capturing element configured to capture an object image formed by light that has passed through an optical member using an electrochromic element and capable of electrically controlling a transmittance of the light, wherein the image capturing apparatus further comprises one or more processors that execute a program stored in a memory, wherein the program, when executed by the one or more processors, causes the one or more processors to function as: a distribution acquisition unit configured to acquire a distribution characteristic of a transmittance of the electrochromic element based on a current value flowing to the electrochromic element: and an image processing unit configured to correct an image signal captured by the image capturing element in accordance with the distribution characteristic, is provided.

According to some other embodiments, an image processing apparatus comprising: one or more processors that execute a program stored in a memory, wherein the program, when executed by the one or more processors, causes the one or more processors to function as: a data acquisition unit configured to acquire an image data file including an image signal obtained by capturing an object image formed by light that has passed through an optical member using an electrochromic element and capable of electrically controlling a transmittance of the light: an information acquisition unit configured to acquire, based on information recorded in the image data file, information representing a distribution characteristic of a transmittance of the electrochromic element at the time of image capturing; and a correction unit configured to execute correction processing for the image signal based on the information representing the distribution characteristic, is provided.

According to still other embodiments, a control method of an image capturing apparatus including an image capturing element configured to capture an object image formed by light that has passed through an optical member using an electrochromic element and capable of electrically controlling a transmittance of the light, the control method comprising: acquiring a distribution characteristic of a transmittance of the electrochromic element based on a current value flowing to the electrochromic element; and correcting an image signal captured by the image capturing element in accordance with the distribution characteristic, is provided.

According to further embodiments, a non-transitory computer-readable storage medium storing a program configured to cause a computer provided in an image capturing apparatus to function as each unit of the image capturing apparatus, wherein the image capturing apparatus comprises an image capturing element configured to capture an object image formed by light that has passed through an optical member using an electrochromic element and capable of electrically controlling a transmittance of the light, wherein the image capturing apparatus further comprises one or more processors that execute the program stored in the non-transitory computer-readable storage medium, wherein the program, when executed by the one or more processors, causes the one or more processors to function as: a distribution acquisition unit configured to acquire a distribution characteristic of a transmittance of the electrochromic element based on a current value flowing to the electrochromic element: and an image processing unit configured to correct an image signal captured by the image capturing element in accordance with the distribution characteristic, is provided.

According to still further embodiments, a non-transitory computer-readable storage medium storing a program configured to cause a computer to function as each unit of the image processing apparatus, wherein the image processing apparatus comprises one or more processors that execute the program stored in the non-transitory computer-readable storage medium, wherein the program, when executed by the one or more processors, causes the one or more processors to function as: a data acquisition unit configured to acquire an image data file including an image signal obtained by capturing an object image formed by light that has passed through an optical member using an electrochromic element and capable of electrically controlling a transmittance of the light; an information acquisition unit configured to acquire, based on information recorded in the image data file, information representing a distribution characteristic of a transmittance of the electrochromic element at the time of image capturing; and a correction unit configured to execute correction processing for the image signal based on the information representing the distribution characteristic, is provided.

Further features of the present invention will become apparent from the following description of exemplary embodiments (with reference to the attached drawings).

DESCRIPTION OF THE EMBODIMENTS

A detailed embodiment of an image capturing apparatus according to the present invention will now be described with reference to the accompanying drawings. Note that in the following description and drawings, common reference numerals denote common components throughout a plurality of drawings. Hence, the common components will be described by cross-referencing the plurality of drawings, and a description of components denoted by common reference numerals will appropriately be omitted.

Figure 1:
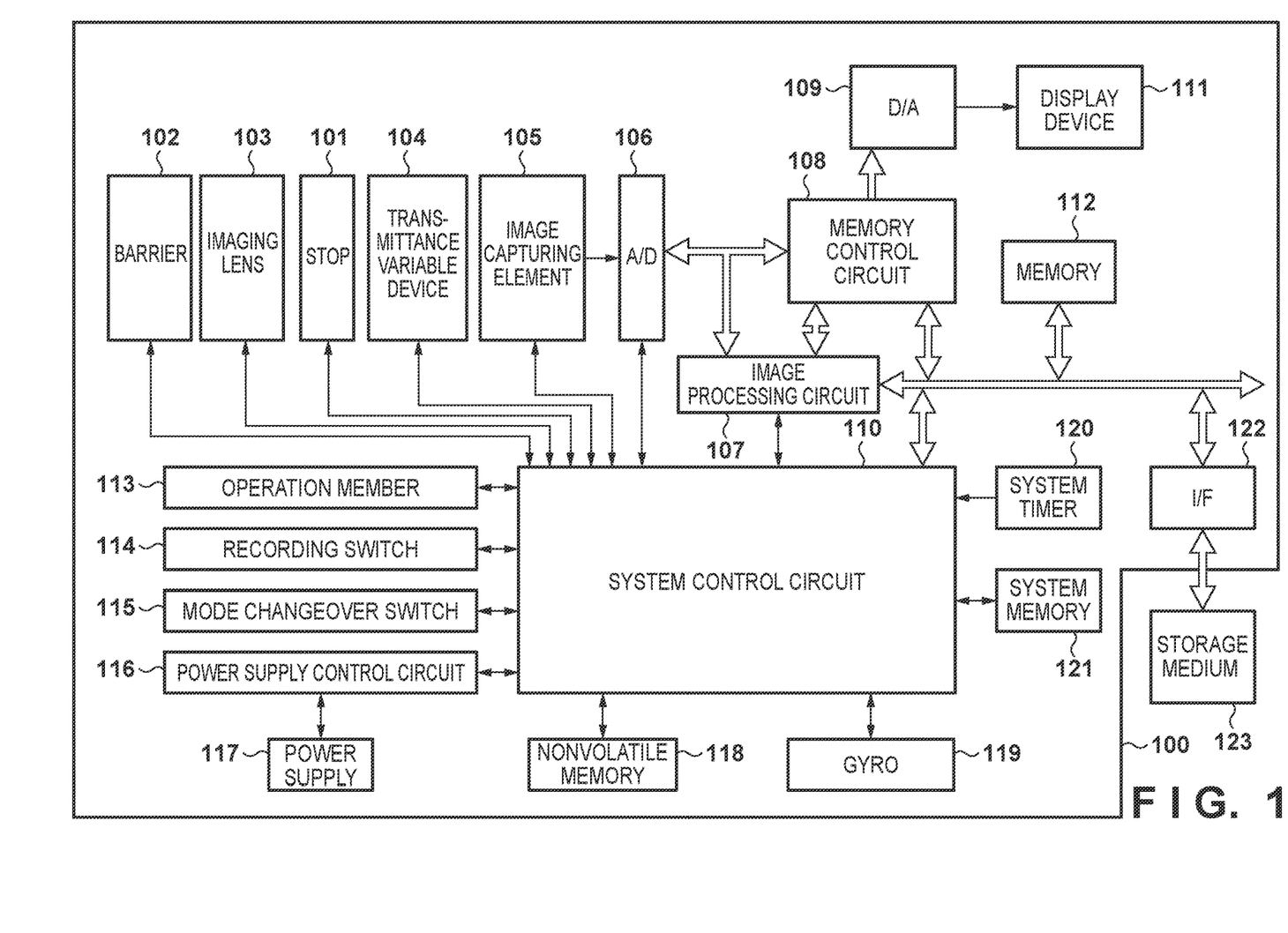
FIG. 1 is a block diagram showing an example of the arrangement of an image capturing apparatus according to an embodiment of the present invention.

The arrangement and the operation of an image capturing apparatus according to the embodiment of the present invention will be described with reference to FIGS. 1 to 7. FIG. 1 is a block diagram showing an example of the internal arrangement of an image capturing apparatus 100 according to the embodiment of the present invention.

The image capturing apparatus 100 includes an imaging lens 103, a stop 101, a transmittance variable device 104 that is an optical member capable of electrically controlling light transmittance, an image capturing element 105, an A/D converter 106, and a barrier 102. The imaging lens 103 is a lens group including a zoom lens, a focus lens, a shift lens, and the like, and forms an object image on the image capturing element. The imaging lens 103 may be detachable from the image capturing apparatus 100. The stop 101 adjusts the size of an opening that passes light, thereby adjusting the light amount. The transmittance variable device 104 functions as an ND filter that adjusts the light amount by adjusting the light transmittance. In this embodiment, the transmittance variable device 104 can electrically control the light transmittance by using an electrochromic element. The image capturing element 105 includes a CCD or CMOS image sensor including a plurality of pixels configured to convert an optical image into an electrical signal, and captures an object image formed by light that has passed through the transmittance variable device 104. The image capturing element 105 can also have functions of controlling a charge accumulation operation, changing an analog gain, changing a read speed, and the like. The A/D converter 106 is used to convert an analog signal output from the image capturing element 105 into a digital signal. The barrier 102 covers an image capturing system including the imaging lens 103 of the image capturing apparatus 100, thereby preventing the image capturing system including the imaging lens 103, the stop 101, and the image capturing element 105 from becoming dirt or broken.

The image capturing apparatus 100 also includes an image processing circuit 107, a memory control circuit 108, a memory 112, a system control circuit 110, a display device 111, a D/A converter 109, a gyro 119, and a nonvolatile memory 118. The system control circuit 110 includes at least one programmable processor (CPU. MPU, or the like) and, for example, loads a program stored in the nonvolatile memory 118 into the memory 112 and executes the program, thereby implementing various functions of the image capturing apparatus 100.

The image processing circuit 107 performs predetermined image processing for data such as an image signal output from the A/D converter 106 or data output from the memory control circuit 108. The image processing includes, for example, processes such as pixel interpolation processing, resize processing such as reduction processing, color conversion processing, gamma correction processing, and digital gain addition processing. In addition, the image processing circuit 107 performs predetermined operation processing using a captured image signal, and transmits the operation result to the system control circuit 110. Based on the operation result transmitted from the image processing circuit 107, the system control circuit 110 performs control such as exposure control, distance measurement control, and white balance control. TTL (Through The Lens) type AF (Auto Focus) processing, AE (Auto Exposure) processing, AWB (Auto White Balance) processing, and the like are thus performed. In addition, the system control circuit 110 may operate the shift lens of the imaging lens 103 in accordance with a motion or posture change of the image capturing apparatus 100 caused by a camera shake or the like detected by the gyro 119. The system control circuit 110 may also perform image blur correction by shifting an image cutout range by the image processing circuit 107.

Data output from the A/D converter 106 is written in the memory 112 via the image processing circuit 107 and the memory control circuit 108 or via the memory control circuit 108. The memory 112 stores data such as an image signal (image data) captured by the image capturing element 105 and converted into digital data by the A/D converter 106 and image data to be displayed on the display device 111. The memory 112 is also used as a system memory configured to store programs to be executed by the system control circuit 110 and information necessary for execution of the programs. The memory 112 has a sufficient storage capacity to store still images and moving images and audio of a predetermined time.

In addition, the memory 112 may also serve as a memory (video memory) for image display. The D/A converter 109 converts data for image display stored in the memory 112 into an analog signal and supplies it to the display device 111. The data for image display written in the memory 112 is thus displayed on the display device 111 via the D/A converter 109. The display device 111 performs display, on a display using liquid crystal or organic EL, according to the analog signal transmitted from the D/A converter 109. When a digital signal temporarily A/D-converted by the A/D converter 106 and accumulated in the memory 112 is converted into analog data by the D/A converter 109, sequentially transferred to the display device 111, and displayed, an electronic viewfinder is implemented, and live view display can be performed.

The nonvolatile memory 118 is an electrically erasable/programmable memory, and, for example, an EEPROM or the like is used. The nonvolatile memory 118 stores constants, programs, various kind of set values, and GUI data for the operation of the system control circuit 110, specific information of the image capturing apparatus 100, and the like. The programs here include programs executed by the system control circuit 110 to implement operations to be described with reference to various kinds of flowcharts to be described later.

The image capturing apparatus 100 further includes an operation member 113, a recording switch 114, a mode changeover switch 115, a power supply control circuit 116, a power supply 117, a system timer 120, a system memory 121, and a storage medium I/F 122. The system timer 120 is a time count circuit that measures times used for various kinds of control and the time of an internal clock. The operation member 113, the recording switch 114, and the mode changeover switch 115 are used to input various kinds of operation instructions to the system control circuit 110 when the user operates the image capturing apparatus 100.

The mode changeover switch 115 switches the operation mode of the image capturing apparatus 100 to one of a moving image recording mode, a still image recording mode, a reproduction mode, and the like. Modes included in the moving image recording mode or the still image recording mode are an auto image capturing mode, an auto scene determination mode, a manual mode, various kinds of scene modes serving as image capturing settings for each image capturing scene, a program AE mode, a custom mode, and the like. The user can directly switch the mode to one of the modes included in the moving image capturing mode by operating the mode changeover switch 115. After the mode is temporarily switched to the moving image capturing mode by the mode changeover switch 115, the user may switch the mode to one of the modes included in the moving image capturing mode using another operation member. The recording switch 114 switches between an image capturing standby state and a moving image capturing state. For example, when the user presses the recording switch 114 of the image capturing apparatus 100 in the image capturing standby state, the image capturing apparatus 100 starts moving image capturing for recording. If the recording switch 114 is pressed to set the image capturing state, the system control circuit 110 starts a series of moving image capturing processes from read of an image signal from the image capturing element 105 to write of a moving image and audio data in a storage medium 123.

A shutter button, a menu button, a cross key, a set button, and the like can be arranged on the operation member 113. When the user presses the shutter button of the image capturing apparatus 100X) halfway in the image capturing standby state, the system control circuit 110 executes still image capturing preparation processing such as AE processing and AF processing. In addition, when the shutter button is fully pressed, the system control circuit 110 starts a series of still image capturing processes from read of an image signal from the image capturing element 105 to write of a still image in the storage medium 123. A different function can be assigned to the operation member 113 in accordance with the situation. The operation member 113 can function as, for example, an end button, a return button, an image feed button, a jump button, a narrow-down button, an attribute change button, and the like. When the menu button is pressed, a menu screen that allows the user to do various kinds of settings is displayed on the display device 111. The user can intuitively perform various kinds of settings using the menu screen displayed on the display device 111 and the operation member 113.

The power supply control circuit 116 includes a battery detection circuit, a DC/DC converter, a switch circuit configured to switch a block to energize, and the like and detects the presence/absence of attachment of a battery, the type of the battery, and the remaining battery level. In addition, the power supply control circuit 116 controls the DC/DC converter based on the detection result and an instruction of the system control circuit 110, and supplies a necessary voltage to the units including the storage medium 123 for a necessary period. The power supply 117 includes a primary battery such as an alkali battery or a lithium battery, a secondary battery such as an NiCd battery, an NiMH battery, or an Li ion battery, an AC adapter configured to receive power supplied from an external power supply, and the like. The storage medium I/F 122 is an interface to the storage medium 123 such as a memory card or a hard disk drive configured to record data. The storage medium 123 is a storage medium such as a memory card configured to record a captured image and the like, and includes a semiconductor memory, a magnetic disk, and the like.

When recording a moving image or a still image in the storage medium 123, the image capturing apparatus 100 according to this embodiment can record a current value I(t), a temperature T(t), and an elapsed time t (to be described later) of an electrochromic element (EC element) 200 at the time of image capturing as additional information (metadata) recorded in, for example, the header of an image data file or the like. Alternatively, distribution characteristic data (to be described later) representing the distribution characteristic of the transmittance of the EC element 200 at the time of image capturing can be recorded as metadata. These metadata enable correction after recording when, for example, image data that does not correct the influence of the distribution of the transmittance of the EC element 200 is recorded in an image data file.

Figure 2:
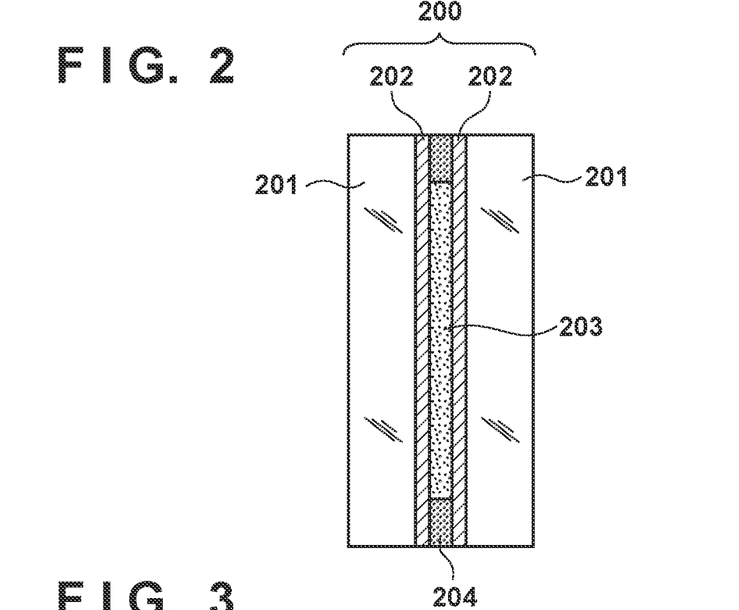
FIG. 2 is a schematic view showing a section of an electrochromic element of the image capturing apparatus shown in FIG. 1.

The transmittance variable device 104 functioning as an optical member configured to change the transmittance of light that has entered the image capturing apparatus 100 will be described next. FIG. 2 is a schematic view showing a section of the electrochromic element (EC element) 200 that is provided in the transmittance variable device 104 and configured to change the transmittance of light that passes through the transmittance variable device 104. The EC element 200 includes a pair of transparent substrates 201, a pair of transparent electrodes 202, and an electrochromic layer (EC layer) 203 arranged between the pair of transparent electrodes 202. The interval of the pair of transparent electrodes 202 is defined by the thickness of a frame-shaped seal member 204. The EC layer 203 containing an electrochromic compound (EC compound) is arranged in the space defined by the pair of transparent electrodes 202 and the seal member 204. The EC layer 203 may be either a solid layer formed using vapor deposition or the like or a solution layer formed by dissolving the EC layer in an electrolyte solution. In other words, the EC element 200 may include the solid type EC layer 203, or may include the solution type EC layer 203.

The EC compound may be an organic compound, or may be an inorganic compound. As the EC compound, an anode compound colored by an oxidation reaction from a transparent state may be used, or a cathode compound colored by a reduction reaction from a transparent state may be used. Alternatively, both an anode EC compound and a cathode EC compound may be used as the EC compounds. In a case in which an organic compound is used as the EC compound, if both an anode organic compound and a cathode organic compound are used, a coloring efficiency with respect to a current flowing to the EC layer 203 can be high.

In this specification, the EC element 200 using both the anode compound and the cathode compound will be referred to as a complementary EC element, and the EC element 200 using one of the anode compound and the cathode compound will be referred to as a unipolar EC element. In the unipolar EC element, an anode EC compound will also be referred to as an anode material, and a cathode compound will also be referred to as a cathode material.

When the complementary EC element is driven, electrons are removed from the EC compound by an oxidation reaction in one electrode, and the EC compound receives the electrons by reduction in the other electrode. By the oxidation reaction, radical cations may be generated from neutral molecules. Additionally, by the reduction reaction, radical anions may be generated from neutral molecules, or radical cations may be generated from dication molecules. Since the EC compound is colored in both of the pair of electrodes, a complementary EC element may be used as the EC element 200 if a high optical density (low transmittance) is needed at the time of coloring.

Meanwhile, the unipolar EC element can suppress power consumption as compared to the complementary EC element. This is because in the complementary EC element, a large current is needed to suppress a self-decoloring phenomenon that occurs when the colored anode EC compound and the colored cathode EC compound exchange electrons. For this reason, if power consumption needs to be reduced in the image capturing apparatus 100, the unipolar EC element may be used as the EC element 200.

If the EC compound is an inorganic compound, the EC element 200 may include an electrolyte layer between the EC layer 203 and at least one of the two transparent electrodes 202. Meanwhile, if the EC compound is an organic compound, the EC element 200 may include an electrolyte layer, as in the case in which the EC compound is an inorganic compound, or the EC layer 203 may contain an electrolyte solution together with the organic compound.

If the EC compound is an organic compound, electroconductive polymers such as polythiophenes and polyanilines, viologen compounds, anthraquinone compounds, and low molecular compounds such as oligothiophene derivatives and phenazine derivatives can be used. If the EC compound is an inorganic compound, metal oxide materials such as $NiO_x$ and $WO_3$ can be used.

The EC layer 203 may have a stacked structure including an electrolyte layer containing an electrolyte and the EC layer 203 containing an EC compound, as described above. In addition, the EC layer 203 may be made of only one type of EC compound, or may be made of a plurality of types of EC compounds. If the EC layer 203 contains a plurality of types of EC compounds, the difference of the oxidation-reduction potential between the EC compounds may be small. If the EC layer 203 contains a plurality of types of EC compounds, for example, the EC layer 203 may contain four or more types of EC compounds including anode compounds and cathode compounds. In addition, the EC layer 203 included in the EC element 200 may contain five or more types of EC compounds.

If the EC layer 203 contains a plurality of types of EC compounds, the oxidation-reduction potentials of a plurality of anode materials may be 60 mV or less, and the oxidation-reduction potentials of a plurality of cathode materials may be 60 mV or less. Additionally, if the EC layer 203 contains a plurality of types of EC compounds, the plurality of types of EC compounds may include a compound having an absorption peak at a wavelength of 400 nm (inclusive) to 500 nm (inclusive), a compound having an absorption peak at a wavelength of 500 nm (inclusive) to 650 nm (inclusive), and a compound having an absorption peak at a wavelength of 650 nm or more. The absorption peak has a half width of 20 nm or more. In addition, the state of the material in a case in which light is absorbed may be an oxidation state, a reduction state, or a neutral state.

The members of the EC element 200 will be described next. If an electrolyte is used in the EC element 200, an arbitrary electrolyte that is an ion-dissociative salt and exhibits satisfactory solubility to a solvent and high compatibility in a solid electrolyte can be used. Electrolytes having electron-donating properties are suitable. These electrolytes can also be called support electrolytes. As the electrolyte, for example, inorganic ion salts such as various kinds of alkali metal salts and alkaline earth metal salts, quaternary ammonium salts, cyclic quaternary ammonium salts, and the like can be used. More specifically, alkali metal salts of Li, Na, and K such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$, and $KCl$, quaternary ammonium salts and cyclic quaternary ammonium salts such as $(CH_3)_4NBF_4$, $(C_2H_5)_4NBF_4$, $(n-C_4H_9)_4NBF_4$, $(n-C_4H_9)_4NPF_4$, $(C_2H_5)_4NBr$, $(C_2H_5)_4NClO_4$, and $(n-C_4Ho)_4NClO_4$ can be used.

The solvent to dissolve the EC compound and the electrolyte is not particularly limited as long as it can dissolve the EC compound and the electrolyte. A solvent having a polarity is particularly suitable. More specifically, organic polar solvents such as water, methanol, ethanol, propylene carbonate, ethylene carbonate, dimethyl sulfoxide, dimethoxyethane, γ-butvrolactone, γ-valerolactone, sulfolane, dimethylformamide, dimethoxyethane, tetrahydrofuran, acetonitrile, propionnitrile, 3-methoxypropionnitrile, benzonitrile, dimethylacetamide, methylpyrrolidinone, and dioxolane can be used.

The EC layer 203 may further contain a polymer matrix or a gelatinizer. If the EC layer 203 contains a polymer matrix or a gelatinizer, the EC layer 203 can be a liquid of high viscosity and can be a gel in some cases. As the polymer matrix or the gelatinizer, for example, polyacrylonitrile, carboxymethylcellulose, pullulan polymers, polyvinyl chloride, polyethylene oxide, polypropylene oxide, polyurethane, polyacrylate, polymethacrylate, polyamide, polvacrylamide, polyester, Nafion*, and the like can be used.

Additionally, as the polymer matrix or the gelatinizer, polymethyl methacrylate (PMMA) may be used.

The transparent substrate 201 and the transparent electrode 202 will be described next. As the transparent substrate 201, for example, colorless or colored glass, tempered glass, and the like can be used. As these glass materials, optical glass substrates such as #7059 available from Corning and BK-7 glass can be used. In addition, a material such as a plastic or ceramic can be used as the transparent substrate 201 as long as it has sufficient transparency.

For the transparent substrate 201, a rigid material that is distorted little is suitable. Note that in this specification, "transparent" means that the transmittance of visible light is 50% or more. As the plastic or ceramic, for example, polyethylene terephthalate, polyethylene naphthalate, polynorbornene, polyamide, polysulfone, polyether sulfone, polyether ether ketone, polyphenylene sulfide, polycarbonate, polyimide, PMMA, and the like can be used.

As the transparent electrode 202, for example, metals and metal oxides such as an indium tin oxide alloy (ITO), fluorine-doped tin oxide (FTO), tin oxide (NESA), indium zinc oxide (IZO), silver oxide, vanadium oxide, molybdenum oxide, gold, silver, platinum, copper, indium, and chromium silicon materials such as polysilicon and amorphous silicon, and carbon materials such as carbon black, graphite, and glassy carbon can be used. Additionally, as the transparent electrode 202, conductive polymers with conductivity improved by a doping treatment or the like, for example, polyaniline, polypyrrole, polythiophene, polyacetylene, polyparaphenylene, and a complex of polyethylenedioxythiophene (PEDOT) and polystyrene sulfonate (PSS) can also be used.

In this embodiment, the EC element 200 may have a high transmittance in a decolored state. For this reason, for example, transparent materials such as ITO, IZO, NESA, PEDOT; PSS, and graphene are suitable for the transparent electrode 202. These transparent materials can be used in various forms such as a bulk and fine particles. The transparent electrode 202 may use a single one of these materials or may use a plurality of materials in combination.

The seal member 204 may use a material that is chemically stable, does not pass gases and liquids, and does not impede the oxidation-reduction reaction of the EC compound. As the seal member 204, for example, an inorganic material such as glass frit, an organic material such as an epoxy resin, or a metal material can be used.

In addition, if the EC layer 203 is of a solution type, the EC element 200 may include a spacer in the EC layer 203. The spacer has a function of defining the distance between the electrodes. The spacer may be made of an inorganic material such as a silica bead or a glass fiber, or an organic material such as polydivinylbenzene, polyimide, polytetrafluoroethylene, fluorocarbon rubber, or epoxy resin. In addition, the seal member 204 may have the function of the spacer, as described above.

If the EC layer 203 of the EC element 200 is of a solution type, the EC element 200 can be formed by injecting a liquid containing an EC compound, which is prepared in advance, into a gap provided between the pair of transparent electrodes 202 using a vacuum injection method, an air injection method, a meniscus method, or the like.

In the image capturing apparatus 100 using the EC element 200 in the transmittance variable device 104, as described above, if an object that enters the image capturing apparatus 100 is bright, the density of the EC element 200 is increased, and the transmittance of light is controlled low, thereby reducing the amount of light that enters the image capturing element 105. Furthermore, since the transmittance of light can be changed without moving the EC element 200, it is possible to prevent a disturbance in an image caused when the moving mechanism of the filter or the like passes across the front of the image capturing element 105, unlike in a case in which the transmittance of light is changed by moving an ND filter with a fixed transmittance. Meanwhile, when changing the transmittance, a relatively large current needs to flow to the EC element 200. For this reason, due to a voltage drop, a potential distribution is generated in the plane of the EC element 200, which crosses the direction of passing light. This causes optical density unevenness (density distribution) in the plane of the EC element 200. The flowing current is larger in the EC element 200 including the solution type EC layer 203 than in the EC element 200 including the solid type EC layer 203. For this reason, the potential distribution is more conspicuous in the EC element 200 including the solution type EC layer 203, and the density unevenness is also more conspicuous. Hence, brightness is uneven in an image captured by the image capturing apparatus 100 as well, and the image quality lowers.

Figure 3:
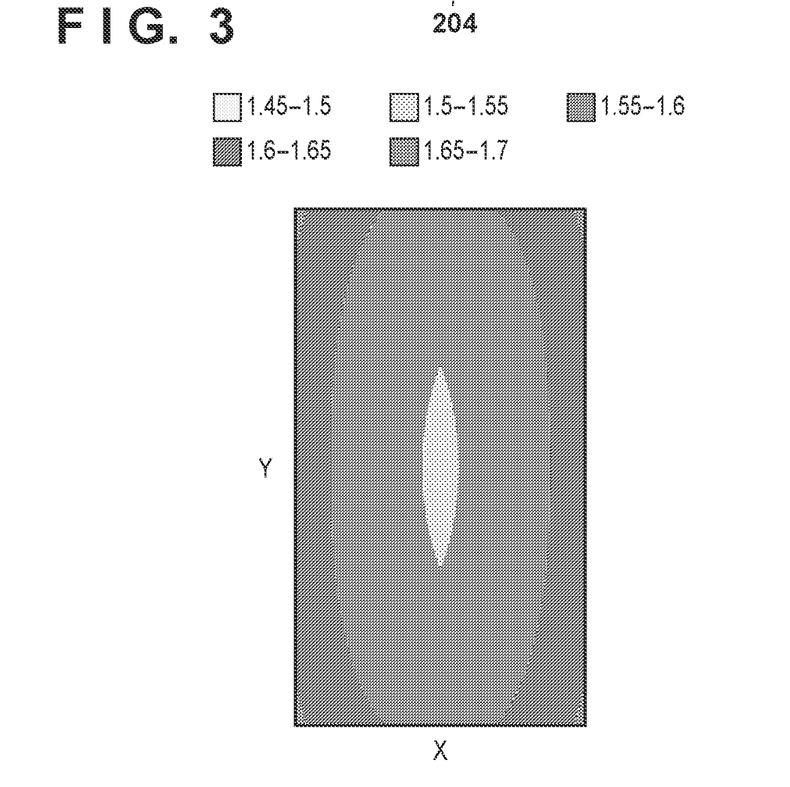
FIG. 3 is a view showing the distribution characteristic of the transmittance of the electrochromic element of the image capturing apparatus shown in FIG. 1.

FIG. 3 shows an example of a density distribution generated in the EC element 200. FIG. 3 shows a density distribution generated when the EC element 200 including the solution type EC layer 203 having a size of X=9 mm and Y=16 mm is driven by supplying power and applying a voltage of 0.7 V for 10 sec. The optical density at the center is 1.45 (transmittance: 3.2%), and the optical density in the peripheral portion is 1.7 (transmittance: 1.8%). The light amount difference generated by the density difference corresponds to about 0.8 exposure steps, and can be recognized as a light loss in the peripheral portion when a uniform surface such as sky is captured. To correct the light amount difference between the center and the peripheral portion, the image signal acquired by the image capturing element 105 needs to be corrected. To do this correction, it is necessary to know the density distribution (the distribution characteristic of the transmittance of light) generated in the EC element 200.

A method of acquiring the density distribution (the distribution characteristic of the transmittance) generated in the EC element 200 will be described. In this embodiment, the image capturing apparatus 100 includes a current measurement circuit (to be described later in detail) functioning as a current acquisition unit configured to acquire a current value flowing to the EC element 200, and a temperature measurement circuit functioning as a temperature acquisition unit configured to acquire the temperature of the EC element 200. The resistance value between the pair of transparent electrodes 202 at a position (x, y) in the plane between the transparent electrodes 202 of the EC element 200 can be regarded as almost constant irrespectively of the temperature. For this reason, based on a current value I flowing to the EC element 200 and a resistance value R of the EC layer 203 between the transparent electrodes 202 of the EC element 200, a potential difference $\Delta E(x, y)$ between a potential $E_1(x, y)$ and a potential $E_2(x, y)$ at the position (x, y) where the pair of transparent electrodes 202 face each other can be obtained by $$\Delta E(x,y) = E_1(x,y) - E_2(x,y) = I(x,y) \cdot R(x,y) \quad (1)$$

The potential difference $\Delta E(x, y)$ corresponds to the density (transmittance of light) of the EC element 200 at the position (x, y). Hence, when the potential differences $\Delta E(x, y)$ (the voltage distribution of the EC element 200) at a plurality of positions (x, y) of the transparent electrodes 202 are obtained with respect to the current value I, a distribution characteristic ΔOD of the transmittance (density distribution) of the EC element 200 can be obtained. Defining a potential difference ΔEref(x, y) corresponding to an appropriate density of the EC element 200 with respect to the current value I as 1, the ratio (ΔE(x, y)/ΔEref(x, y)) or difference (ΔE(x, y)−ΔEref(x, y)) of each potential difference ΔE(x, y) can be saved as the distribution characteristic data of the transmittance. Alternatively, defining the transmittance corresponding to ΔEref(x, y) as 1, the transmittance corresponding to ΔE(x, y) may be saved as the distribution characteristic data.

Here, a method of obtaining the potential difference ΔE(x, y) at the predetermined position (x, y) in the plane between the transparent electrodes 202 will be described in more detail. The current measurement circuit measures the current value I supplied from an element control circuit (to be described later) to the EC element 200. The current measurement circuit measures, for example, a current flowing to a power supply line between the element control circuit and the EC element 200. If there is one power supply line, the current value I can be one value. If there are a plurality of power supply lines, the current value I can be either one value or a plurality of values. Based on the current value I and the distribution information of the resistance values in the plane between the pair of transparent electrodes 202 of the EC element 200, which is acquired in advance, a current value I(x, y) at the predetermined position (x, y) in the plane between the transparent electrodes 202 can be obtained.

Here, the distribution information of the resistance values in the plane between the transparent electrodes 202 can be, for example, resistance values on a current flowing path from the point where the current value I is measured by the current measurement circuit to each position (x, y) of the transparent electrode 202. For example, concerning a position $(x_1, y_1)$ and a position $(x_2, y_2)$ farther from the point where the current value I is measured than the position $(x_1, y_1)$, the resistance values can be smaller on the current path from the point where the current value I is measured to the position $(x_1, y_1)$ than on the current path to the position $(x_2, y_2)$. In this case, concerning the current values I(x, y), $I(x_1, y_1) > I(x_2, y_2)$ can hold. In addition, the resistance value R(x, y) of the EC layer 203 between the transparent electrodes 202 can be decided from the structure of the EC layer 203 such as the type of the EC compound contained in the EC layer 203 and the thickness of the EC layer 203. If the structure or thickness of the EC layer 203 is almost even in the plane, the resistance value R(x, y) of the EC layer 203 can be constant irrespectively of the position. From the current value I(x, y) and the resistance value R(x, y) at the predetermined position (x, y), the potential difference ΔE(x, y) between the potential $E_1(x, y)$ and the potential $E_2(x, y)$ at the predetermined position (x, y) where the pair of transparent electrodes 202 face each other can be obtained. The distribution information of the resistance values in the plane between the pair of transparent electrodes 202 of the EC element 200 may be, for example, measured and acquired at the time of manufacture of the EC element 200, or may be acquired from the design value of the EC element 200. In addition, the resistance value R of the EC layer 203 may also be measured and acquired at the time of manufacture of the EC element 200, or may be acquired from the design value of the EC element 200.

A time to some extent is necessary from the start of power supply to the EC element 200 until the transmittance of the EC layer 203 stabilizes. For this reason, the elapsed time t after the power value supplied to the EC element 200 to change the transmittance of the EC element 200 starts changing is taken into consideration, and based on the current value I(t) acquired by the current measurement circuit, the potential difference ΔE(t; x, y) between the pair of transparent electrodes 202 at the position (x, y) in the plane can be obtained by $$\Delta E(t; x, y) = E_1(t; x, y) - E_2(t; x, y) \qquad (2)$$
$$= I(t; x, y) \cdot R(t; x, y)$$

A distribution characteristic ΔOD(t) of the transmittance of the EC element 200 can more correctly be acquired from the potential difference ΔE(t; x, y). That is, when the elapsed time t after the power value of the power supplied to the EC element 200 to change the transmittance of the EC element 200 changes is taken into consideration in addition to the current value I flowing to the EC element 200, the distribution characteristic ΔOD of the transmittance can more correctly be acquired.

Furthermore, a diffusion coefficient that changes the transmittance of the EC material in the EC layer 203 of the EC element 200 can change depending on the temperature. Hence, the distribution characteristic ΔOD(t, T) of the transmittance at the temperature T acquired by the temperature measurement circuit can be obtained, as the difference between a distribution characteristic $\Delta OD_c(t, T)$ of the transmittance of a coloring amount by an electrode reaction and a distribution characteristic $\Delta OD_b(t, T)$ of the transmittance of a decoloring amount by a self-erasing reaction, by $$\Delta OD(t,T) = \Delta OD_c(t,T) - \Delta OD_b(t,T) \qquad (3)$$

That is, in addition to the current value I flowing to the EC element 200, and the elapsed time t after the power value supplied to the EC element 200 changes, when the temperature T measured by the temperature measurement circuit 404 is further taken into consideration, the distribution characteristic ΔOD of the transmittance can more accurately be acquired.

Here, the decoloring amount by the self-erasing reaction in the second term is an amount depending on the gap between the transparent electrodes 202 as well. Note that the decoloring amount is decided only by the first term at the elapsed time t to 0 because the amount is generated only when colored molecules are diffused to almost the intermediate point between the transparent electrodes 202. In this way, when the diffusion coefficient of the EC material, which changes depending on the temperature T, is taken into consideration, the distribution characteristic ΔOD of the transmittance of the EC element 200 can more correctly be acquired.

In this way, the optical density at each position in the plane of the EC layer 203 of the EC element 200 can be obtained by at least the current value I. In addition, the optical density at each position in the plane of the EC layer 203 of the EC element 200 can more correctly be obtained by further taking at least one of the temperature T and the elapsed time t into consideration. The image processing circuit 107 corrects the image signal acquired by the image capturing element 105 in accordance with the acquired distribution characteristic ΔOD of the transmittance. The distribution characteristic of the transmittance may be acquired using equations (1) to (3) described above. In addition, a plurality of distribution characteristic data of the transmittance of the EC element 200 associated with different current values I flowing to the EC element 200 may be stored in advance in the nonvolatile memory 118, and the correction may be performed by referring to the distribution characteristic data. Furthermore, a plurality of distribution characteristic data of the transmittance of the EC element 200 associated with different combinations of the current value I, the elapsed time t, and the temperature T are stored in advance in the nonvolatile memory 118. A more exact correction may be performed by referring to the distribution characteristic data.

The unevenness of brightness caused by the distribution of the transmittances of the EC element 200 is corrected in the above-described way. The transparent electrodes 202 configured to supply power to the EC layer 203 of the EC element 200 are thus made thick to lower the resistance, thereby reducing the necessity of suppressing the transmittance distribution (density unevenness). Accordingly, even under a condition to increase the light amount entering the image capturing element 105, lowering of the transmittance of light can be suppressed by increasing the thickness of the transparent electrodes 202. By effectively using incident light, lowering of the quality of an image acquired by the image capturing apparatus 100 can be suppressed.

Figure 4:
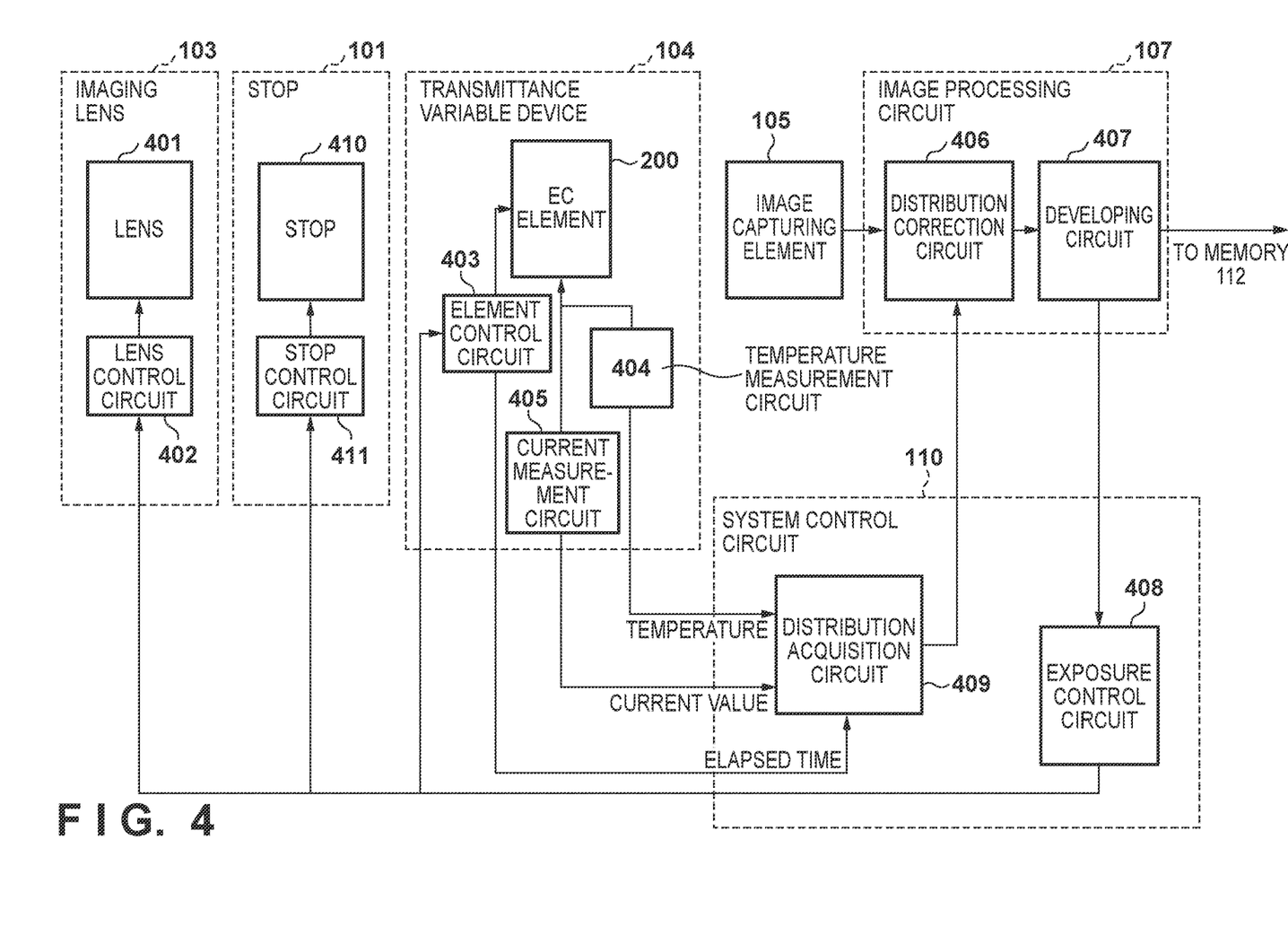
FIG. 4 is a block diagram showing an arrangement configured to correct the distribution characteristic of the transmittance in the image capturing apparatus shown in FIG. 1.

A method of correcting, by the image processing circuit 107, the distribution of the transmittance generated in the transmittance variable device 104 will be described next in more detail with reference to FIG. 4 that shows details of a part of FIG. 1 and the block diagram of FIG. 1. The imaging lens 103 includes a lens 401 and a lens control circuit 402. The lens 401 includes a lens used to capture an object, and a mechanism configured to perform zooming, focusing, and the like. The lens control circuit 402 is an electrical unit such as a motor configured to operate the mechanism of the lens 401. The stop 101 includes a stop 410 and a stop control circuit 411. The stop 410 is the mechanism of the stop configured to control the amount of light that has passed through the imaging lens 103. The stop control circuit 411 is an electrical unit such as a motor configured to operate the mechanism of the stop 410.

The transmittance variable device 104 includes the EC element 200, and an element control circuit 403, a temperature measurement circuit 404, and a current measurement circuit 405, which are described above. The EC element 200 changes the transmittance of light that passes through the transmittance variable device 104. The element control circuit 403 controls power to be supplied to the EC element 200, thereby controlling the transmittance of the EC element 200. The temperature measurement circuit 404 measures the temperature T of the EC element 200. The temperature T can be measured by, for example, arranging, as the temperature measurement circuit 404, a thermocouple or the like near the EC element 200. The current measurement circuit 405 measures the current value I of the current flowing to the EC element 200 by the power supplied from the element control circuit 403. As described above, the current measurement circuit 405 may acquire the current value I by measuring the current flowing to the power supply line to supply the power from the element control circuit 403 to the EC element 200.

The image processing circuit 107 includes a distribution correction circuit 406 and a developing circuit 407. The distribution correction circuit 406 corrects an image signal acquired by the image capturing element 105 in accordance with the distribution characteristic of the transmittance generated in the EC element 200 as shown in FIG. 3. In addition, the developing circuit 407 can perform gamma correction or color processing to record the image corrected by the distribution correction circuit 406.

The system control circuit 110 includes a distribution acquisition circuit 409, and an exposure control circuit 408 configured to control brightness in image capturing. The distribution acquisition circuit 409 acquires, from the current measurement circuit 405, the current value I of the current flowing to the EC element 200 by the power supplied from the element control circuit 403, which is measured by the current measurement circuit 405. The distribution acquisition circuit 409 acquires the distribution characteristic of the transmittance of the EC element 200 based on the current value I. In addition, the distribution acquisition circuit 409 may acquire the distribution characteristic of the transmittance of the EC element 200 based on the elapsed time t after the power supplied to the EC element 200 changes and the temperature T of the EC element 200 acquired from the temperature measurement circuit 404, in addition to the current value I, as described above.

A description will be made here assuming that the image capturing apparatus 100 is set in the moving image recording mode and in a manual exposure mode by the mode changeover switch 115. In addition, a description will be made assuming that the distribution of the transmittance of the EC element 200 is acquired based on the current value I, the elapsed time t, and the temperature T described above. Here, the manual exposure mode is a mode in which the user operates the operation member 113 and sets all of the f-number of the stop 101, the transmittance of the transmittance variable device 104, the gain of the image capturing element 105, and the electronic shutter speed (exposure time), thereby deciding the exposure. Assume that user operates the operation member 113 to do a setting such that the transmittance variable device 104 halves incident light. In response to this, the exposure control circuit 408 of the system control circuit 110 outputs a control instruction to the element control circuit 403 to change the transmittance of the EC element 200 of the transmittance variable device 104. Accordingly, the element control circuit 403 changes the transmittance of the EC element 200. Here, an example in which the user manually sets the exposure condition is shown. However, the present invention is not limited to this. Even if an auto exposure (AE) mode in which the exposure control circuit 408 controls the exposure using the result of development of the developing circuit 407 is set, the transmittance of the EC element 200 can be changed using the exposure condition decided by the exposure control circuit 408.

As described above, the distribution characteristic of the transmittance of the EC element 200 in the plane changes along with a change of the transmittance. The distribution characteristic is decided based on the elapsed time t from the start of the change and the current value I at that point of time. The distribution characteristic of the transmittance also changes depending on the temperature T As the elapsed time t, for example, a time after the change of the power supplied from the element control circuit 403 to the EC element 200 to change the transmittance of the EC element to a predetermined transmittance set by the user or the like may be measured. Additionally, as described above, the current value I is measured by the current measurement circuit 405, and the temperature T is measured by the temperature measurement circuit 404. The elapsed time t, the current value I, and the temperature T are transmitted to the distribution acquisition circuit 409, and the distribution acquisition circuit 409 calculates, using equations (2) and (3), the distribution characteristic of the transmittance based on the elapsed time t, the current value I, and the temperature T, which are acquired. For example, the distribution acquisition circuit 409 acquires the distribution characteristic of the transmittance assuming that the transmittance of the EC element 200 lowers as the voltage applied to the EC element 200 becomes high. The distribution acquisition circuit 409 transmits the distribution characteristic to the distribution correction circuit 406 of the image processing circuit 107. The distribution correction circuit 406 of the image processing circuit 107 corrects the image signal acquired by the image capturing element 105 in accordance with the distribution characteristic of the transmittance. For example, the distribution correction circuit 406 applies the inverse characteristic of the distribution characteristic of the transmittance to the image signal, thereby canceling the distribution characteristic (unevenness) of the transmittance generated in the EC element 200. That is, the distribution correction circuit 406 of the image processing circuit 107 may correct the image signal such that the gain of a portion of a low transmittance in the distribution characteristic becomes higher than the gain of a portion of a high transmittance in the distribution characteristic. Here, when calculating the distribution characteristic of the transmittance using equations (2) and (3), a CPU having a high operation capability is necessary. For this reason, as described above, a method of registering, in the nonvolatile memory 118, a transmittance calculation result acquired in advance or measured data, as the distribution characteristic data of the transmittance, in accordance with the current value I, the elapsed time t, and the temperature T may be used. A method of selecting distribution characteristic data to be used correct the image signal acquired by the image capturing element 105 from a plurality of distribution characteristic data will be described below.

Figure 5:
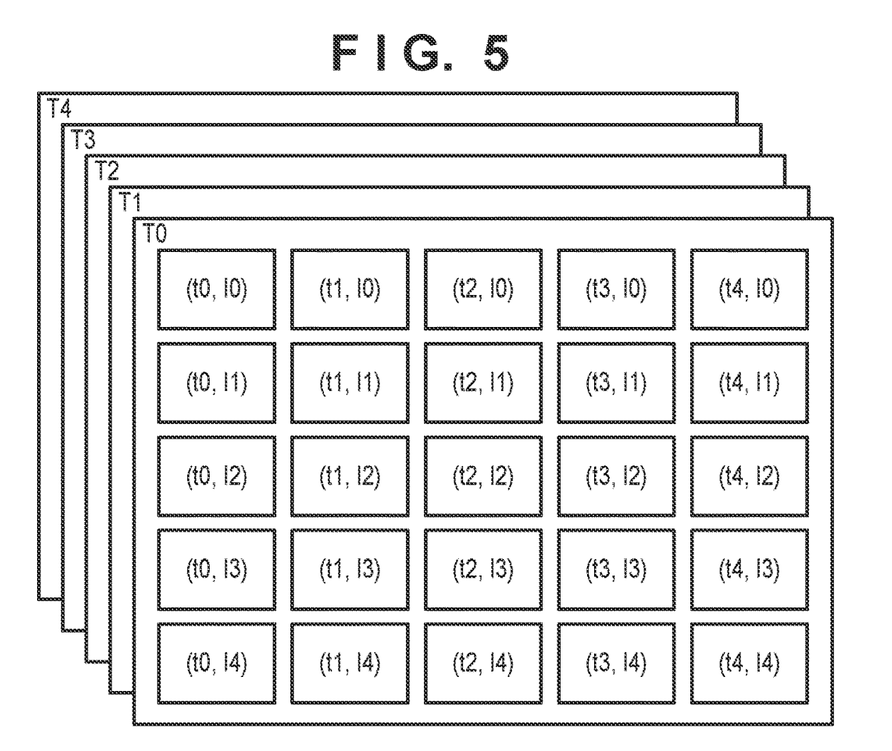
FIG. 5 is a view showing the map of all data of the distribution characteristic data of the image capturing apparatus shown in FIG. 1.
Figure 6:
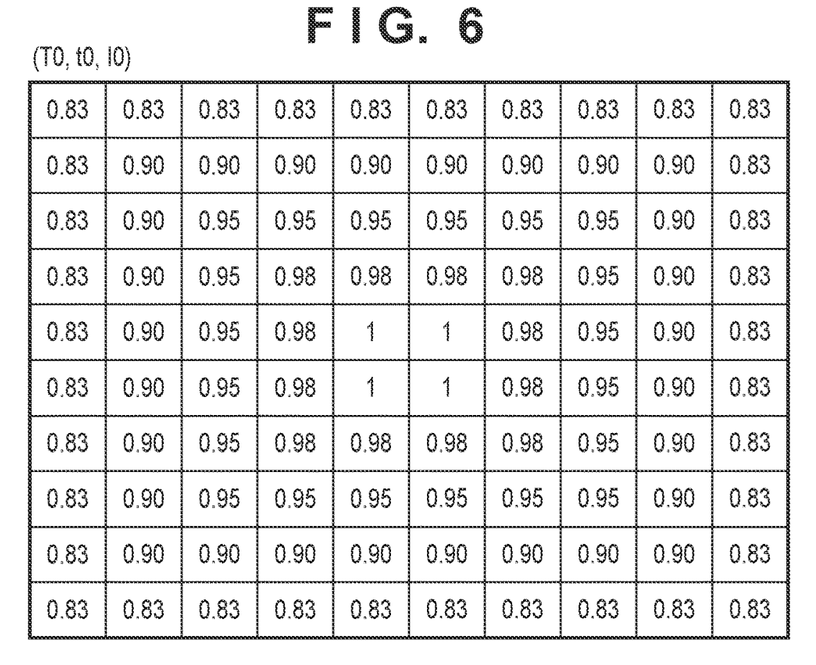
FIG. 6 is a view showing an example of the distribution characteristic data of the image capturing apparatus shown in FIG. 1.

First, each of the current value I, the elapsed time t, and the temperature T is divided into a plurality of representative points, and a plurality of distribution characteristic data each associated with a combination of the three parameters are registered in the nonvolatile memory 118. The distribution characteristic data may be stored in the nonvolatile memory 118 at the time of shipment, or may be stored after shipment by a user operation using a maintenance mode or the like. Here, assume that each parameter is divided into five points, that is, the current value I is divided into current values I0 to I4, the elapsed time t is divided into elapsed times t0 to t4, and the temperature T is divided into temperatures T0 to T4. FIG. 5 shows the map of distribution characteristic data stored in the nonvolatile memory 118. For example, a rectangle at an upper left corner (t0, I0) is distribution characteristic data for the temperature T0, the elapsed time t0, and the current value I0. Five types of maps corresponding to the temperatures T0 to T4 exist as the map of the combination of the elapsed time t and the current value I at the given temperature T, and 5×5×5=125 types of distribution characteristic data are provided as combinations. FIG. 6 shows an example of one distribution characteristic data in the plurality of distribution characteristic data shown in FIG. 5. The vertical and horizontal directions of the rectangle correspond to the vertical and horizontal directions of the image signal read from the image capturing element 105. The transmittance (appropriate transmittance) at the center is set to a reference value of 1. For each of the remaining portions, a ratio to the appropriate transmittance is stored. In the distribution characteristic data shown in FIG. 6, the numerical values lower toward the periphery. This shows that as the distribution characteristic of the transmittance, it is brightest at the center, and it is dark on the periphery.

When acquiring the distribution characteristic, the distribution acquisition circuit 409 may acquire, as the distribution characteristic of the transmittance of the EC element 200, distribution characteristic data in which the values of the parameters are closest to the current value I, the elapsed time t, and the temperature T acquired from the transmittance variable device 104. Alternatively, the distribution acquisition circuit 409 may execute linear interpolation or the like for the parameters and generate a new distribution characteristic from the stored distribution characteristic data.

The distribution characteristic of the transmittance of the EC element 200 acquired by the distribution acquisition circuit 409 is sent to the distribution correction circuit 406 of the image processing circuit 107. The image processing circuit 107 applies a digital gain of a magnification shown in FIG. 6 to the image signal acquired by the image capturing element 105, thereby correcting the image signal. For example, the value of the distribution characteristic data at the upper left corner is 0.83. Hence, the image signal acquired by image capturing of the image capturing element 105 is captured with a brightness of 0.83 although the original brightness is (1.0). Hence, the distribution correction circuit 406 of the image processing circuit 107 applies a digital gain of 1/0.83 to the image signal acquired at the upper left corner to do correction to a higher brightness. This can obtain the original brightness. The distribution correction circuit 406 of the image processing circuit 107 executes the digital gain application processing of correcting the brightness to the image signal of the entire screen obtained by a plurality of pixels included in the image capturing element 105. Here, if the same digital gain is applied to all pixels in a block, the change in the brightness at the boundary of blocks may be noticeable. Hence, the distribution correction circuit 406 of the image processing circuit 107 may correct the image signals output from the plurality of pixels of the image capturing element 105 on a pixel basis in accordance with the distribution characteristic. For example, at the boundary between blocks, the value of the digital gain to be applied may be set to change continuously or stepwise on a pixel basis.

Figure 7:
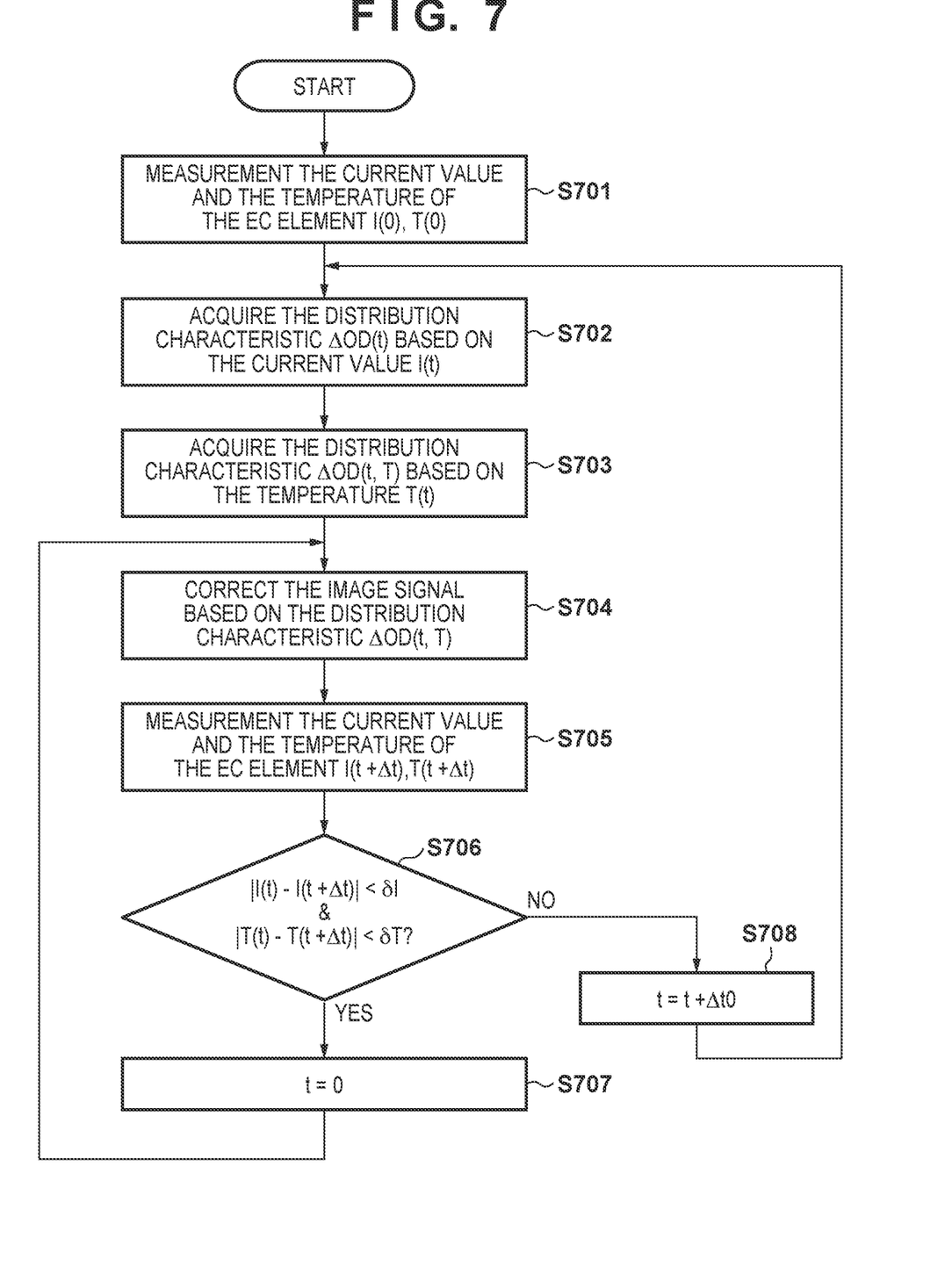
FIG. 7 is a flowchart showing an example of the operation of the image capturing apparatus shown in FIG. 1.

Correction processing of correcting unevenness of brightness caused by the distribution characteristic of the transmittance of the EC element 200 of the transmittance variable device 104 will be described next with reference to the flowchart of FIG. 7. This processing can be executed for an arbitrary captured image. The correction target image can be either an image for recording or an image for display. Additionally, the correction target image can be either a moving image or a still image. Note that if the transmittance of the EC element 200 is not controlled, the correction processing may not be performed. In addition, the correction processing may be executed in real time, or may be executed for recorded image data having the current value I(t), the temperature T(t), and the elapsed time t of the EC element 200 at the time of image capturing as, for example, metadata.

First, in step S701, the distribution acquisition circuit 409 of the system control circuit 110 acquires the current value I(t) and the temperature T(t) of the EC element 200 from the current measurement circuit 405 and the temperature measurement circuit 404 of the transmittance variable device 104. The elapsed time t is 0 in step S701 immediately after the start of processing. After the current value I(t) and the temperature T(t) are acquired, the system control circuit 110 advances the process to step S702.

In step S702, the distribution acquisition circuit 409 acquires the distribution characteristic $\Delta OD(t)$ based on the current value I(t) at the given elapsed time t. This will be described with reference to FIG. 5. If the elapsed time t is t1, and the current value I is I1, the distribution acquisition circuit 409 acquires a total of five distribution characteristic data (t1, I1) at the temperature T0, (t1, I1) at the temperature T1, (t1, I1) at the temperature T2, (t1, I1) at the temperature T3, and (t1, I1) at the temperature T4. After these distribution characteristic data are acquired, the system control circuit 110 advances the process to step S703.

In step S703, the distribution acquisition circuit 409 acquires distribution characteristic data (distribution characteristic ΔOD(t, T)) obtained by further adding the condition of the temperature T(t) to the distribution characteristic data acquired in step S702. This will be described as the continuation of step S702 with reference to FIG. 5. If the temperature T(t) is the temperature T0, the distribution acquisition circuit 409 acquires the distribution characteristic data (t1, I1) at the temperature T0 as the distribution characteristic at the elapsed time t. After the distribution characteristic data (t1, I1) at the temperature T0 is acquired, the system control circuit 110 advances the process to step S704.

In step S704, the distribution correction circuit 406 of the image processing circuit 107 corrects the image signal acquired by the image capturing element 105 in accordance with the distribution characteristic acquired in step S703 by the distribution acquisition circuit 409. The image signal corrected at this time can be the image signal acquired by the image capturing element 105 at the elapsed time t. After the image is corrected, the system control circuit 110 advances the process to step S705.

In step S705, the distribution acquisition circuit 409 of the system control circuit 110 acquires the current value I(t+Δt) and the temperature T(t+Δt) at the elapsed time (t+Δt) from the current measurement circuit 405 and the temperature measurement circuit 404 of the transmittance variable device 104. In the arrangement shown in FIG. 7, after the image is corrected in step S704, the system control circuit 110 advances the process to step S705. However, the processing of step S704 and the processing of step S705 may be performed in parallel. After the current value I(t+Δt) and the temperature T(t+Δt) are acquired, the system control circuit 110 advances the process to step S706.

In step S706, it is determined whether the change between the current value I(t) and the current value I(t+Δt) and the change between the temperature T(t) and the temperature T(t+Δt) are smaller than predetermined thresholds δI and δT, respectively. This determination may be done by, for example, the system control circuit 110, or may be done by a determination circuit arranged independently of the system control circuit 110 and configured to perform the determination. A description will be made here assuming that the system control circuit 110 performs the determination concerning the changes of the current value I and the temperature T. If the changes of the current value I and the temperature T are smaller than the predetermined thresholds δI and δT, the system control circuit 110 determines that the reaction of the density change of the transmittance of the EC element 200 has ended, and advances the process to step S707. The system control circuit 110 resets the elapsed time t to 0 in step S707, and returns the process to step S704. After that, step S705 is ended, and the determination of the presence/absence of the changes of the current value I and the temperature T in step S706 is repeated. Meanwhile, if the changes of the current value I and the temperature T exceed the predetermined thresholds δI and δT in step S706, the system control circuit 110 determines that the reaction of the density change of the transmittance of the EC element 200 continues, and advances the process to step S708. In step S708, the system control circuit 110 updates the elapsed time t to elapsed time (t+Δt). The process returns to step S702, and the system control circuit 110 acquires the distribution characteristic again.

In the above-described way, the distribution characteristic of the transmittance of the EC element is acquired based on the electrical characteristic of the transparent electrode 202 or the EC layer 203 of the EC element 200 and the current flowing to the EC element 200, and the image signal is corrected based on the distribution characteristic. Accordingly, the influence of density unevenness caused by the electrical characteristic of the EC element 200 used as the transmittance variable device 104 is suppressed, and degradation of image quality caused by the transmittance variable device 104 using the EC element 200 is suppressed. Additionally, even if the image capturing by the image capturing element 105 is continuous image capturing like moving image capturing, the transmittance of the EC element 200 can be changed during image capturing by the image capturing element 105 while suppressing disturbance in the image caused by changing the transmittance of the transmittance variable device 104.

In this embodiment, an arrangement in which the transmittance variable device 104 is provided in the image capturing apparatus 100 has been described. However, the transmittance variable device 104 need not be provided in the image capturing apparatus 100 if the transmittance can be controlled by the system control circuit 110, and the system control circuit 110 can acquire at least the current value I flowing to the EC element 200. That is, the transmittance variable device 104 may be provided in an external unit detachable from the image capturing apparatus.

For example, in a lens interchangeable image capturing apparatus 100', the user may attach an external unit including the transmittance variable device 104 to the image capturing apparatus 100' as an adapter attached between the imaging lens 103 (exchangeable lens) and the image capturing apparatus 100' including the image capturing element 105. In this case, the transmittance variable device 104 may be attached via a lens mount used to attach the exchangeable lens of the image capturing apparatus 100'. Via the lens mount, the exposure control circuit 408 included in the system control circuit 110 of the image capturing apparatus 100' transmits, to the element control circuit 403 of the transmittance variable device 104, a signal used to control the transmittance of the EC element 200. The element control circuit 403 changes the transmittance of the EC element 200 to a desired transmittance in accordance with the signal received from the exposure control circuit 408 of the image capturing apparatus 100' to control the transmittance. In addition, the transmittance variable device 104 transmits information such as the current value I, the elapsed time t, and the temperature T of the EC element 200 to the distribution acquisition circuit 409 of the image capturing apparatus 100' via the lens mount. Accordingly, even if the transmittance variable device 104 is arranged independently of the image capturing apparatus 100' as an external unit detachable from the image capturing apparatus 100', the same effect as in the above-described case in which the transmittance variable device 104 is arranged in the image capturing apparatus 100 can be obtained.

At this time, the elapsed time t may be counted by the system control circuit 110. For example, the time when the system control circuit 110 outputs the signal used to change the transmittance from the exposure control circuit 408 to the element control circuit 403 of the transmittance variable device 104 may be counted as the elapsed time t=0. Additionally, for example, in the image capturing apparatus 100', the function of the transmittance variable device 104 may be imparted to the imaging lens 103 (exchangeable lens) that is an external unit detachable from the image capturing apparatus 100'. In this case as well, the transmittance variable device 104 can be operated as in the above-described case in which the external unit including the transmittance variable device 104 is connected as the adapter between the image capturing apparatus and the imaging lens, and the same effect as in the above-described image capturing apparatus 100 can be obtained.

Additionally, in this embodiment, the image signal acquired by the image capturing element 105 in the image capturing apparatus 100 is corrected in accordance with the distribution characteristic acquired by the distribution acquisition circuit 409. However, the present invention is not limited to this. The image signal acquired by the image capturing element 105 may undergo the correction processing outside the image capturing apparatus 100. For example, an image data file including the image signal captured by the image capturing element 105 is recorded in the memory 112. At this time, the data of the current value I flowing to the EC element 200 at the time of image capturing, the temperature T of the EC element 200 at the time of image capturing, and the elapsed time t after the change of the power supplied to the EC element at the time of image capturing may be included in the image data file. The data of the image signal and the data of the current value I, the temperature T, and the elapsed time t may not be stored inside the image capturing apparatus 100 but may directly be recorded in the storage medium 123. The data of the image signal and the parameters of the EC element 200 are loaded into a hard disk drive functioning as a data acquisition unit of a computer (for example, a personal computer) functioning as an image processing apparatus via the storage medium 123, wired communication, wireless communication, or the like. The user may correct the image captured by the image capturing apparatus 100 on the computer using the data. More specifically, first, the computer is caused to function as an information acquisition unit and acquire information representing the distribution characteristic of the transmittance of the EC element 200 at the time of image capturing based on the above-described various kinds of information recorded in the image data file. At least the data of the current value I is recorded in the image data file together with the image signal, and the information representing the distribution characteristic of the transmittance may be acquired using equations (1) to (3) described above. In addition, the information of distribution characteristic data representing the distribution characteristic of the transmittance of the EC element 200 at the time of image capturing is recorded in the image data file, and the information representing the distribution characteristic of the transmittance of the EC element 200 may be acquired from the image data file. Next, the computer is caused to function as a correction unit and execute correction processing for the image signal based on the information representing the distribution characteristic. This can also obtain the same effect as described above.

The embodiments of the present invention have been described above. However, the present invention is not limited to the embodiments, as a matter of course, and the above-described embodiments can appropriately be changed or combined without departing from the scope of the present invention. For example, the distribution characteristic data and the interpolation method therefor are merely examples, and are not particularly limited.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-152436, filed Aug. 13, 2018 which is hereby incorporated by reference herein in its entirety.

What is claimed is:

1. An image capturing apparatus comprising an image capturing element configured to capture an object image formed by light that has passed through an optical member using an electrochromic element and capable of electrically controlling a transmittance of the light,
wherein the image capturing apparatus further comprises one or more processors that execute a program stored in a memory, wherein the program, when executed by the one or more processors, causes the one or more processors to function as:
a distribution acquisition unit configured to acquire a distribution characteristic of a transmittance of the electrochromic element based on a current value flowing to the electrochromic element; and
an image processing unit configured to correct an image signal captured by the image capturing element in accordance with the distribution characteristic.

2. The apparatus according to claim 1, wherein the distribution acquisition unit acquires the distribution characteristic based on a voltage distribution of the electrochromic element according to the current value.

3. The apparatus according to claim 1, wherein the image capturing apparatus further comprises a memory configured to store a plurality of distribution characteristic data of the transmittance of the electrochromic element, which are associated with different current values, and
the distribution acquisition unit acquires the distribution characteristic from the plurality of distribution characteristic data based on the current values.

4. The apparatus according to claim 1, wherein the distribution acquisition unit acquires the distribution characteristic based on the current value and an elapsed time from a start of a change of a value of power supplied to the electrochromic element.

5. The apparatus according to claim 4, further comprising a temperature acquisition unit configured to acquire a temperature of the electrochromic element executed by the one or more processors,
wherein the distribution acquisition unit acquires the distribution characteristic based on the current value, the elapsed time, and the temperature acquired by the temperature acquisition unit.

6. The apparatus according to claim 5, wherein the distribution acquisition unit acquires the distribution characteristic based on a voltage applied to the electrochromic element, which is acquired in accordance with the current value, the elapsed time, and the temperature.

7. The apparatus according to claim 2, wherein the distribution acquisition unit acquires the distribution characteristic assuming that the transmittance of the electrochromic element lowers as the voltage applied to the electrochromic element becomes high.

8. The apparatus according to claim 5, wherein the image capturing apparatus further comprises a memory configured to store a plurality of distribution characteristic data of the transmittance of the electrochromic element, which are associated with different combinations of the current value, the elapsed time, and the temperature, and
the distribution acquisition unit acquires the distribution characteristic from the plurality of distribution characteristic data based on the current value, the elapsed time, and the temperature.

9. The apparatus according to claim 1, wherein the image processing unit corrects the image signal such that a gain of a portion of a low transmittance in the distribution characteristic becomes higher than a gain of a portion of a high transmittance in the distribution characteristic.

10. The apparatus according to claim 1, wherein the electrochromic element comprises a solution type electrochromic layer.

11. The apparatus according to claim 1, wherein the image capturing element comprises a plurality of pixels, and
the image processing unit corrects the image signal on a pixel basis in accordance with the distribution characteristic.

12. The apparatus according to claim 1, wherein the optical member is provided in the image capturing apparatus.

13. The apparatus according to claim 1, wherein the optical member is provided in an external unit detachable from the image capturing apparatus.

14. The apparatus according to claim 13, wherein the external unit comprises one of an exchangeable lens and an adapter attached between the exchangeable lens and the image capturing apparatus.

15. An image processing apparatus comprising: one or more processors that execute a program stored in a memory, wherein the program, when executed by the one or more processors, causes the one or more processors to function as:
a data acquisition unit configured to acquire an image data file including an image signal obtained by capturing an object image formed by light that has passed through an optical member using an electrochromic element and capable of electrically controlling a transmittance of the light;
an information acquisition unit configured to acquire, based on information recorded in the image data file, information representing a distribution characteristic of a transmittance of the electrochromic element at the time of image capturing; and
a correction unit configured to execute correction processing for the image signal based on the information representing the distribution characteristic.

16. The apparatus according to claim 15, wherein of a current value flowing to the electrochromic element at the time of image capturing, a temperature of the electrochromic element at the time of image capturing, and an elapsed time from a change of power supplied to the electrochromic element at the time of image capturing, at least the current value is recorded in the image data file, and
the information acquisition unit acquires the information representing the distribution characteristic of the transmittance based on at least the current value.

17. The apparatus according to claim 15, wherein the information representing the distribution characteristic of the transmittance of the electrochromic element at the time of image capturing is recorded in the image data file, and
the information acquisition unit acquires the information representing the distribution characteristic of the transmittance of the electrochromic element from the image data file.

18. A control method of an image capturing apparatus including an image capturing element configured to capture an object image formed by light that has passed through an optical member using an electrochromic element and capable of electrically controlling a transmittance of the light, the control method comprising:
acquiring a distribution characteristic of a transmittance of the electrochromic element based on a current value flowing to the electrochromic element; and
correcting an image signal captured by the image capturing element in accordance with the distribution characteristic.

19. A non-transitory computer-readable storage medium storing a program configured to cause a computer provided in an image capturing apparatus to function as each unit of the image capturing apparatus,
wherein the image capturing apparatus comprises an image capturing element configured to capture an object image formed by light that has passed through an optical member using an electrochromic element and capable of electrically controlling a transmittance of the light,
wherein the image capturing apparatus further comprises one or more processors that execute the program stored in the non-transitory computer-readable storage medium, wherein the program, when executed by the one or more processors, causes the one or more processors to function as:
a distribution acquisition unit configured to acquire a distribution characteristic of a transmittance of the electrochromic element based on a current value flowing to the electrochromic element, and
an image processing unit configured to correct an image signal captured by the image capturing element in accordance with the distribution characteristic.

20. A non-transitory computer-readable storage medium storing a program configured to cause a computer to function as each unit of the image processing apparatus,
wherein the image processing apparatus comprises one or more processors that execute the program stored in the non-transitory computer-readable storage medium, wherein the program, when executed by the one or more processors, causes the one or more processors to function as:

a data acquisition unit configured to acquire an image data file including an image signal obtained by capturing an object image formed by light that has passed through an optical member using an electrochromic element and capable of electrically controlling a transmittance of the light;

an information acquisition unit configured to acquire, based on information recorded in the image data file, information representing a distribution characteristic of a transmittance of the electrochromic element at the time of image capturing; and a correction unit configured to execute correction processing for the image signal based on the information representing the distribution characteristic.

* * * * *